Patented Dec. 19, 1950

2,534,277

UNITED STATES PATENT OFFICE 2,534,277

CRYSTALLIZATION POINT DEPRESSANTS FOR DDT HYDROCARBON SOLUTIONS AND FUNGICIDAL INSECTICIDES OBTAINED THEREBY

Leo Liberthson, Bronx, N. Y., and Jacob Faust, Belleville, N. J., assignors to L. Sonneborn Sons, Inc., a corporation of Delaware No Drawing. Application February 19, 1946, Serial No. 648,821

9 Claims. (Cl. 167—30)

This invention relates to new and useful improvements in crystallization point depressants for DDT hydrocarbon solutions and fungicidal insecticides obtained thereby.

Petroleum hydrocarbons, particularly those of a Saybolt viscosity (at 100° F.) of between 30 and 50 seconds, are commonly used either as such or as carriers for specific insecticidal agents in the control of a variety of insects. These petroleum hydrocarbons or the insecticide-petroleum hydrocarbon solutions are mostly used in the form of their aqueous emulsions. Though a variety of other solvents have been from time to time proposed and used, the petroleum hydrocarbons are preferred inter alia by reason of their relative chemical and physical inertness and their relative low evaporation rate. A further advantage for the insecticidal use of petroleum hydrocarbons lies in their superior capacity to form very finely divided and dispersed droplets, giving rise to nebulae that will hover over and around the area sprayed for a considerable period of time, thus producing conditions most favorable for insecticidal control.

One of the most effective insecticides is paradichlordiphenyl trichlorethane. This agent, however, though soluble in petroleum hydrocarbons of the aforementioned viscosity range, is in its petroleum hydrocarbon solutions subject to crystallization or precipitation upon temperature drop.

The minimum effective concentration for residual film formation of paradichlordiphenyl trichlorethane is normally considered to be about 5%. By residual film formation is meant the characteristic of remaining deposited in a fine film on the object sprayed after the evaporation or other removal, such as by weathering, of the carrier.

Petroleum hydrocarbon solutions of paradichlordiphenyl trichlorethane however are stable, i. e., substantially non-crystallizing in effective concentrations only at temperatures above the lower temperatures that may be encountered in year-round spraying operations or in the year-round storage of such solutions. Thus, petroleum hydrocarbon solutions of 5% and in excess of 5% of paradichlordiphenyl trichlorethane, are stable only at temperatures of 85° and higher. Higher concentrations demand proportionately higher temperatures for stability. If the temperature drops below the point of stability for a given concentration, crystallization or precipitation of the insecticide takes place. Even though thereafter the temperature will reach or even go slightly above the critical point at which crystallization took place, redissolution will not be readily effected. It is then usually necessary to heat the solution to temperatures considerably higher than the critical temperatures of crystallization for the given concentrations.

For many agricultural purposes it is necessary to apply to the same object to be treated, such as plants, produce, soil, etc., an insecticide as well as a fungicide. For economy of operation, it is desirable to accomplish this in a single operation rather than in separate operations. Both the insecticide and fungicide are usually made available individually in suitable solvent solution, which are then extended in water by emulsification. The most desirable procedure is the use of a single solution containing both the insecticide and fungicide in a common solvent which may then, as such, in a single operation be extended in the aqueous medium. Solutions of paradichlordiphenyl trichlorethane in petroleum hydrocarbon, however, are already fairly sensitive to crystallization and any addition of a fungicide further enhances that sensitivity. Furthermore, many fungicides are not soluble in petroleum hydrocarbons and thus make their combination with paradichlordiphenyl trichlorethane in petroleum hydrocarbon solution impossible.

One object of the invention embraces inter alia a crystallization point depressant for petroleum hydrocarbon solutions of paradichlordiphenyl trichlorethane.

Another object of the invention embraces inter alia a fungicidal insecticide comprising as the insecticidal component a petroleum hydrocarbon solution of paradichlordiphenyl trichlorethane and as the fungicidal component one substantially soluble in said hydrocarbon solution and acting to depress the crystallization point normally inherent in said solution.

By crystallization point as used herein is meant that temperature point at which at a temperature drop the paradichlordiphenyl trichlorethane begins to crystallize or precipitate out of its solution.

The foregoing and further objects of the invention will be understood from the following description:

The crystallization point depressant in accordance with the invention comprises a cuprammoniacal petroleum mahogany sulfonate containing occluded oil, and small quantities of a phthalic acid aliphatic alcohol ester.

The cuprammoniacal petroleum mahogany sulfonate used in accordance with the invention is one corresponding substantially to the following general formula

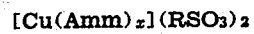
[Cu(Amm)$_x$](RSO$_3$)$_2$ in which RSO$_3$ designates a petroleum mahogany sulfonate radical in which Amm designates a member of the group of ammoniacal compounds consisting of NH$_3$ and aliphatic and mixed aliphatic-aromatic, primary, secondary, and tertiary amines, aromatic carbocyclic and heterocyclic ring H substituted primary and secondary amines and aromatic heterocyclic compounds with an N in ring chain configuration. Such a cuprammoniacal petroleum mahogany sulfonate is described, for example, as to its scope and method of manufacture in the copending application of Leo Liberthson, Serial No. 588,069, filed April 12, 1945, now U. S. Patent No. 2,455,687. The cuprammoniacal petroleum mahogany sulfonates useful in accordance with the present invention are those containing varying amounts of "occluded oil." As set forth in said Liberthson Patent No. 2,455,687, they are made from petroleum mahogany sulfonates. The latter are conventionally obtained in the fuming sulfuric acid refining of petroleum oil distillates and contain varying amounts of what is usually referred to in the art as "occluded oil," i. e., oil tenaciously held or occluded after their separation from the oil layer containing the same and resulting from the acid refining referred to. Depending upon varying conditions of sulfuric acid distillate refining, the occluded oil content of the petroleum mahogany sulfonate may range from 30 to 50%, but usually from 30 to 40%. It is this occluded oil which is carried over through the conversion reaction into the final cuprammoniacal petroleum mahogany sulfonates and being retained by these as tenaciously as the original occluded oil held by the petroleum mahogany sulfonates. This expression "occluded oil" as used herein in connection with the cuprammoniacal petroleum mahogany sulfonates is to designate that portion of oil, i. e., petroleum hydrocarbon, which is relatively tenaciously retained or occluded by these sulfonates in the course of their manufacture.

The aliphatic phthalate used as a component of the novel crystallization depressant is preferably present in amounts of from 15 to 30% and for the best results in amounts from 20 to 25% calculated on the amount of cuprammoniacal petroleum sulfonate present (based on dry weight). Within the broad scope of the invention, however, the percentage of phthalate to sulfonate in the depressant should be not less than 5% by weight of the sulfonate. Whereas the amounts herein specified for best results, using appropriate amounts of the depressant, produce crystallization point depression below 0° F., lesser percentage ratios of phthalate to sulfonate down to the minimum percentage herein specified will produce crystallization point depressions of a lesser calibre, say down to about 25° F., which suffices for many purposes and particularly in milder climates. For adequate fungicidal effect, however, at least 50% and preferably at least 70% of the aggregate sulfonate and phthalate by weight of paradichlordiphenyl trichlorethane in solution should be used. All amounts of component ingredients specified in accordance with the invention are calculated on a dry weight basis, with all amounts of the cuprammoniacal petroleum mahogany sulfonates calculated on the basis of dry sulfonates, i. e. without occluded oil.

Preferred phthalates in accordance with the invention are dialkyl phthalates, including substituted dialkyl phthalates such as dialkyl ether phthalates and particularly good results are obtained with dimethyl phthalate and diethylene glycol monoalkyl ether phthalates.

The fungicidal insecticide in accordance with the invention comprises a petroleum hydrocarbon solution of paradichlordiphenyl trichlorethane having normally a relatively high crystallization point due to the paradichlordiphenyl trichlorethane dissolved therein. A cuprammoniacal petroleum mahogany sulfonate containing occluded oil and at least 5% by dry weight of said sulfonate of a phthalic acid aliphatic alcohol ester, said sulfonate and said ester being present in amount and potency sufficient to appreciably lower the crystallization point by at least 10° F., said ester being present in amount up to its solubility limit in said petroleum hydrocarbon.

The preferred method of preparing the fungicidal insecticide in accordance with the invention is to first dissolve the cuprammoniacal sulfonate and the phthalate in the hydrocarbon and to thereafter add the paradichlordiphenyl trichlorethane. Alternatively, however, the phthalate and sulfonate may be added either by way of their combination or separately to a previously prepared hydrocarbon solution of paradichlordiphenyl trichlorethane.

Petroleum hydrocarbons useful for the fungicidal insecticide in accordance with the invention may be any suitable petroleum hydrocarbon or petroleum hydrocarbon cut of the type, for instance, conventionally used either as such or by way of carrier for insecticidal purposes. A suitable petroleum hydrocarbon distillate is, for example, one of a Saybolt viscosity (at 100° F.) of between 30 and 50 seconds and constitutes a particularly satisfactory carrier agent for the fungicidal insecticide in accordance with the invention.

The following examples are furnished by way of illustration and not of limitation:

*Example I*

100 parts by weight of cuprammoniacal petroleum mahogany sulfonate containing 35 parts by weight of retained oil were warmed to about 150° F. and then blended with 15 parts by weight of dimethyl phthalate.

The cuprammoniacal petroleum mahogany sulfonate was prepared by adding 56 parts by weight of 20° F. Bé. ammonia to a solution of 25 parts by weight of CuSO$_4$.5H$_2$O in 500 parts by weight of water and admixing the resulting deep blue solution of cuprammonium hydroxide with a hot aqueous dispersion of 150 parts by weight of commercial petroleum mahogany sodium sulfonate containing 65% sulfonates, dry basis; after permitting to settle overnight the upper oil layer was separated and dehydrated by blowing with warm air yielding a deep azure blue viscous cuprammoniacal petroleum mahogany sulfonate having an occluded oil content of about 35% and characterized by complete petroleum hydrocarbon solubility at normal temperatures.

*Example II*

Five parts by weight of paradichlordiphenyl trichlorethane were dissolved at 80° F. in 95 parts by weight of 30 viscosity (Saybolt at 100° F.) petroleum distillate. This solution was then placed in an A. S. T. M. cold-test cabinet. The solution was observed at every temperature drop of 10° and the point at which crystallization took place was observed. Crystallization first appeared at 72° F. and was progressive until at 20° F. substantially the entire quantity of the paradichlordiphenyl trichlorethane had crystallized out. The crystallized solution was removed from the cold cabinet and the supernatant solvent decanted. Determination of the amount remaining in solution showed only 1.2% of paradichlordiphenyl trichlorethane. Thus, 75% of the originally dissolved compound had crystallized out at 20° F.

When the crystallized mass was allowed to revert to room temperature, re-solution did not take place to any appreciable extent. It was necessary to heat the solution to a temperature of about 95-100° F. before complete re-solution was effected.

Example III 5.75 parts by weight of the depressant made in accordance with Example I were dissolved in 94.25 parts by weight of a 30 viscosity (Saybolt at 100° F.) petroleum distillate. 5 parts by weight of paradichlordiphenyl trichlorethane were dissolved in 95 parts by weight of the solution so prepared. The solution was prepared at 80° F. and was then placed in an A. S. T. M. cold-test cabinet, being thereafter examined at every 10° drop in temperature. No crystallization was observed down to minus 10° F.

The following table exemplifies the crystallization points obtained with products compounded in accordance with Example III and prepared in accordance with Example I, except that different phthalates and different cuprammoniacal petroleum mahogany sulfonates were used. The table gives in each case the particular phthalate and particular cuprammoniacal sulfonate used and its percentage proportion by weight of the latter to sulfonate (dry weight), the crystallization points in each case being determined as set forth in Example II.

having by way of ammoniacal agent for instance ammonia, aniline, aminoethanol, or the like. In all cases of preparing the cuprammoniacal petroleum mahogany sulfonates following the procedure of Example I hereinabove outlined, it is preferred to use in each case molar amounts of the ammoniacal component.

The products obtained in accordance with the preceding examples, including those set forth in the foregoing table, exhibit high fungicidal and insecticidal properties and crystallization points sufficiently low to permit spraying and storage under year-round conditions for almost any given climate.

The foregoing description is for purposes of illustration and not of limitation and it is therefore our intention that the invention be limited only by the appended claims or their equivalents wherein we have endeavored to claim broadly all inherent novelty.

We claim:

1. A crystallization point depressant for petroleum hydrocarbon solutions of paradichlordiphenyl trichlorethane having normally a relatively high crystallization point due to the paradichlordiphenyl trichlorethane dissolved therein, predominantly comprising a cuprammoniacal petroleum mahogany sulfonate containing occluded oil and at least 5% by dry weight of said sulfonate of a phthalic acid aliphatic alcohol ester.

2. A crystallization point depressant in accordance with claim 1 in which said ester is present in amount from 15 to 30% by dry weight of said sulfonate.

3. A crystallization point depressant for petroleum hydrocarbon solutions of paradichlordiphenyl trichlorethane having normally a relatively high crystallization point due to the paradichlordiphenyl trichlorethane dissolved therein,

Table

| Phthalate | Cuprammoniacal Sulfonate | Percentage Phthalate to Sulfonate (dry weight) | Crystallization point (A. S. T. M.) |
|---|---|---|---|
| | | *Percent* | ° *F.* |
| Dimethyl Phthalate | Cuprammoniacal (triethanolamino) petroleum mahogany sulfonate | 25 | −15 |
| | Cuprammoniacal (morpholino) petroleum mahogany sulfonate | 20 | −20 |
| | Cuprammoniacal (pyridino) petroleum mahogany sulfonate | 20 | −10 |
| | Cuprammoniacal (isoamylamino) petroleum mahogany sulfonate | 20 | −15 |
| Diethyl Phthalate | Cuprammoniacal (triethanolamino) petroleum mahogany sulfonate | 20 | 0 |
| | Cuprammoniacal (morpholino) petroleum mahogany sulfonate | 20 | −5 |
| | Cuprammoniacal (pyridino) petroleum mahogany sulfonate | 20 | −5 |
| | Cuprammoniacal (isoamylamino) petroleum mahogany sulfonate | 20 | −5 |
| Dibutyl Phthalate | Cuprammoniacal (triethanolamino) petroleum mahogany sulfonate | 20 | 0 |
| | Cuprammoniacal (morpholino) petroleum mahogany sulfonate | 20 | −5 |
| | Cuprammoniacal (pyridino) petroleum mahogany sulfonate | 20 | 0 |
| | Cuprammoniacal (isoamylamino) petroleum mahogany sulfonate | 20 | 0 |
| Dioctyl Phthalate | Cuprammoniacal (triethanolamino) petroleum mahogany sulfonate | 20 | 0 |
| | Cuprammoniacal (morpholino) petroleum mahogany sulfonate | 20 | 0 |
| | Cuprammoniacal (pyridino) petroleum mahogany sulfonate | 20 | 0 |
| | Cuprammoniacal (isoamylamino) petroleum mahogany sulfonate | 20 | 0 |
| Diamyl Phthalate | Cuprammoniacal (triethanolamino) petroleum mahogany sulfonate | 20 | −5 |
| | Cuprammoniacal (morpholino) petroleum mahogany sulfonate | 20 | 0 |
| | Cuprammoniacal (pyridino) petroleum mahogany sulfonate | 20 | −5 |
| | Cuprammoniacal (isoamylamino) petroleum mahogany sulfonate | 20 | 0 |
| Diethylene Glycol mono-ethylether phthalate. | Cuprammoniacal (triethanolamino) petroleum mahogany sulfonate | 20 | −15 |
| | Cuprammoniacal (morpholino) petroleum mahogany sulfonate | 20 | −25 |
| | Cuprammoniacal (pyridino) petroleum mahogany sulfonate | 20 | −20 |
| | Cuprammoniacal (isoamylamino) petroleum mahogany sulfonate | 20 | −20 |

The various cuprammoniacal petroleum mahogany sulfonates recited in the table were prepared as set forth in Example I except that instead of the ammonia there prescribed other ammoniacal agents were used, i. e. triethanolamine, morpholine, pyridine and isoamylamine respectively. Any other substantially oil-soluble cuprammoniacal petroleum mahogany sulfonate may be used with similar results to those indicated in the foregoing table, including those which predominantly comprises a cuprammoniacal petroleum mahogany sulfonate containing occluded oil and at least 5%, by dry weight of said sulfonate, of a dialkyl phthalate.

4. A crystallization point depressant in accordance with claim 3 in which said dialkyl phthalate is dimethyl phthalate present in amount from 15 to 30% by dry weight of said sulfonate.

5. A crystallization point depressant in accordance with claim 3 in which said dialkyl phthalate is diethylene glycol mono alkyl ether phthalate present in amount from 15 to 30% by dry weight of said sulfonate.

6. An insecticidal composition which comprises a petroleum hydrocarbon solution of paradichlordiphenyl trichlorethane having normally a relatively high crystallization point due to the paradichlordiphenyl trichlorethane dissolved therein, a cuprammoniacal petroleum mahogany sulfonate containing occluded oil and at least 5%, by dry weight of said sulfonate, of a phthalic acid aliphatic alcohol ester, said sulfonate and said ester being present in the aggregate to at least 50% by weight of the paradichlordiphenyl trichlorethane in solution, said ester being present in amount up to its solubility limit in said petroleum hydrocarbon.

7. An insecticidal composition in accordance with claim 6 in which said ester is a dialkyl phthalate, is present from 15 to 30% by dry weight of said sulfonate and in which said ester and said sulfonate are present in the aggregate to at least 50% by weight of said paradichlordiphenyl trichlorethane in solution.

8. An insecticidal composition in accordance with claim 6 in which said ester is dimethyl phthalate present from 15 to 30% by dry weight of said sulfonate and in which said ester and said sulfonate are present in the aggregate to at least 50% by weight of said paradichlordiphenyl trichlorethane in solution.

9. An insecticidal composition in accordance with claim 6 in which said ester is diethylene glycol mono ethyl ether phthalate present from 15 to 30% by dry weight of said sulfonate and in which said ester and said sulfonate are present in the aggregate to at least 50% by weight of said paradichlordiphenyl trichlorethane in solution.

LEO LIBERTHSON.
JACOB FAUST.

REFERENCES CITED

The following references are of record in the file of this patent:

UNITED STATES PATENTS

| Number | Name | Date |
|---|---|---|
| 1,679,919 | Rogers et al. | Aug. 7, 1928 |
| 2,110,608 | Moore et al. | Mar. 8, 1938 |
| 2,134,158 | Volck | Oct. 25, 1938 |
| 2,228,407 | Schuler et al. | Jan. 14, 1941 |
| 2,412,720 | Dolman | Dec. 17, 1946 |
| 2,420,928 | Bosquet et al. | May 20, 1947 |
| 2,448,665 | Fleck et al. | Sept. 7, 1948 |
| 2,455,687 | Liberthson | Dec. 7, 1948 |

OTHER REFERENCES

Kerns et al.: Ann. Report of Agri. & Horti. Research Station, Long Ashton, Bristol, 1934, page 110.

Wells: Jour. Eco. Entom. 37, No. 1 (Feb. 1944), pages 136, 137.

Jour. Econ Ent., Feb. 1944, vol. 37, pages 132, 133 by Lindquist et al.

Soap and Sanitary Chemicals, Nov. 1945, page 110, Jones et al.

Hackh's Chem. Dict., 3rd ed., 1944, pages 635, 636, "Petroleum."

Jones et al.: Soap & San. Chem., Nov. 1945, page 110.

Fleck et al.: I. & E. Chem. 38 No. 2 (Feb. 1946) 177, 178.